United States Patent
Kreile

[11] Patent Number: 6,149,189
[45] Date of Patent: Nov. 21, 2000

[54] COVER CAP FOR AN AIRBAG UNIT

[75] Inventor: Holger Kreile, Elsenfeld, Germany

[73] Assignee: TRW Automotive Safety Systems GmbH, Aschaffenburg, Germany

[21] Appl. No.: 09/190,484

[22] Filed: Nov. 12, 1998

[30] Foreign Application Priority Data

Nov. 13, 1997 [DE] Germany .................. 297 20 139 U

[51] Int. Cl.$^7$ .................................. B60R 21/20
[52] U.S. Cl. .............. 280/731; 74/558.5; 200/61.55; 280/728.3
[58] Field of Search ................... 280/728.3, 731, 280/728.1; 200/64.54, 61.55; 74/552, 554, 558, 558.5

[56] References Cited

U.S. PATENT DOCUMENTS

| | | |
|---|---|---|
| 4,655,101 | 4/1987 | Endo et al. . |
| 5,085,097 | 2/1992 | Harata et al. . |
| 5,297,813 | 3/1994 | Baba et al. . |
| 5,338,906 | 8/1994 | Yokota . |
| 5,410,114 | 4/1995 | Furuie et al. . |
| 5,508,482 | 4/1996 | Martin et al. . |
| 5,569,893 | 10/1996 | Seymour . |
| 5,685,557 | 11/1997 | Persson et al. . |
| 5,762,365 | 6/1998 | Worrell et al. . |
| 5,794,968 | 8/1998 | Yamamoto et al. . |

FOREIGN PATENT DOCUMENTS

| | | |
|---|---|---|
| 0568764 | 11/1993 | European Pat. Off. . |
| 0572125 | 12/1993 | European Pat. Off. . |
| 3827794 | 3/1989 | Germany . |
| 4133881 | 11/1992 | Germany . |
| 4242157 | 6/1993 | Germany . |
| 4344615 | 6/1994 | Germany . |
| 19521937 | 12/1995 | Germany . |
| 19614078 | 11/1996 | Germany . |
| 19701936 | 7/1997 | Germany . |
| 19801514 | 10/1998 | Germany . |
| 2290267 | 12/1995 | United Kingdom . |

*Primary Examiner*—Eric Culbreth
*Attorney, Agent, or Firm*—Tarolli, Sundheim, Covell, Tummino & Szabo L.L.P.

[57] ABSTRACT

An apparatus (20) includes a cover cap (1) for an airbag unit accommodated in a steering wheel (20) and a frame part (3) for accommodating the airbag unit. The cover cap (1) has a body consisting of synthetic material, an actuating surface (8), an outer edge portion (18), and an integrally molded flexible web (2). The cover cap (1) is arranged for movement against an elastic return force (10) of the cover cap (1) thereby actuating horn contacts (9) in the actuating surface (8). The outer edge portion (18) of the cover cap (1) is located opposite and spaced apart from a corresponding surface (12) of the frame part (3). The flexible web (2) of the cover cap (1) extends toward the corresponding surface (12) of the frame part (3) for preventing dust and humidity from penetrating the steering wheel (20).

8 Claims, 1 Drawing Sheet

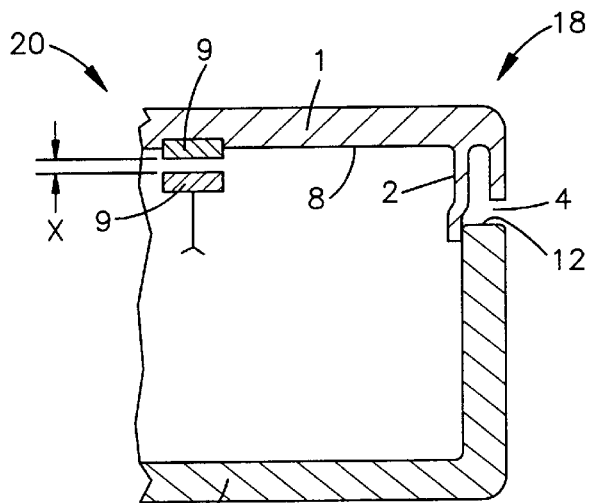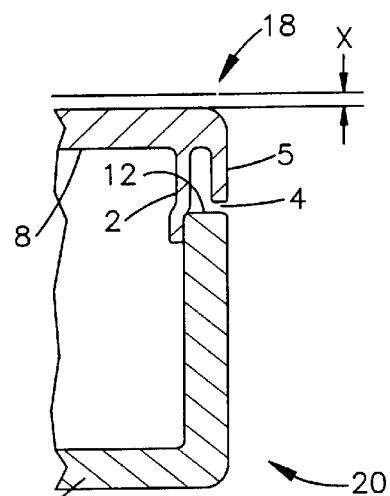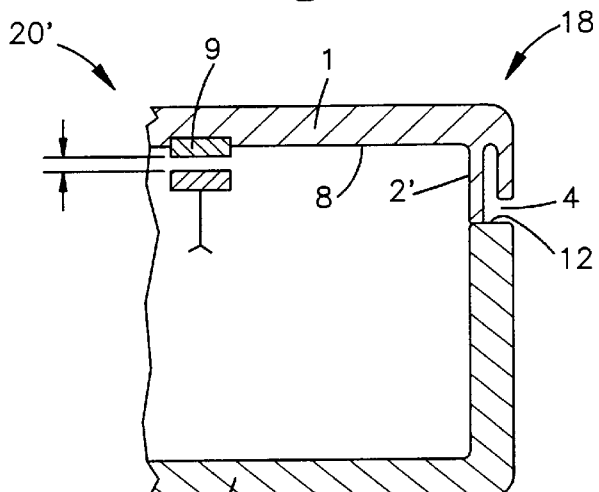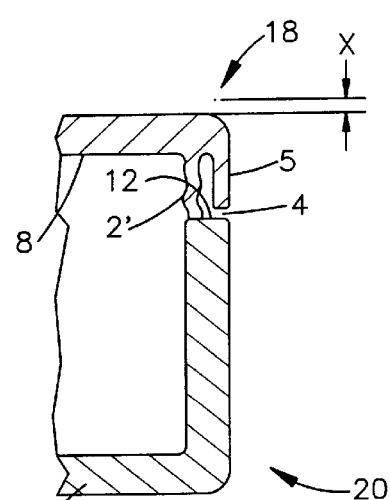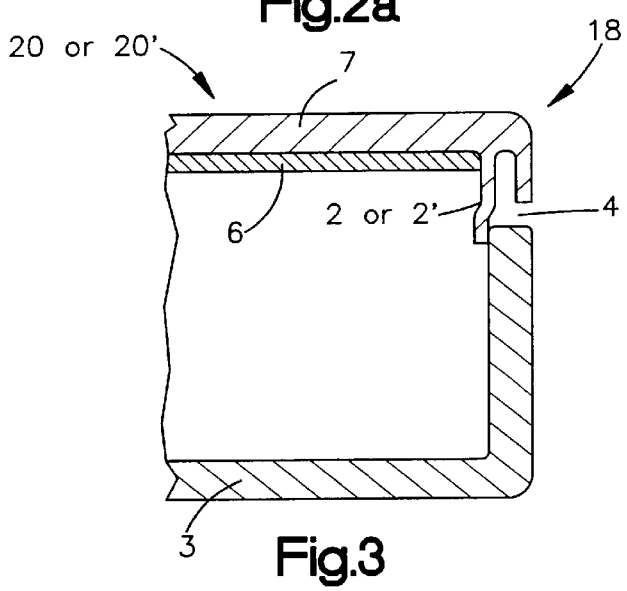

COVER CAP FOR AN AIRBAG UNIT

The invention relates to steering wheel of a vehicle with a cover cap for an airbag unit accommodated therein. The cover cap is movable relative to the steering wheel structure for actuation of a horn switch.

In such cover caps, a clearance to the steering wheel structure surrounding the cap on the side of its outer edge is inevitable, although it is unwanted for visual reasons. Therefore, the clearance is designed so as to be as narrow as possible, but nevertheless it has to be at least wide enough so that under consideration of all manufacturing tolerances movement of the cover cap with respect to the steering wheel structure is possible without abutment against such structure. This clearance extends essentially in prolongation of the surface of the covering cap facing the passenger compartment.

Perpendicularly to this surface, a further clearance is required which has to be somewhat larger than the distance between the contacts of the horn switch, one of these contacts being stationary relative to the steering wheel and the other movably arranged with the cover cap. Between a frame part of the steering wheel—or another component which is immobile relative to the steering wheel—and the outer edge of the cover cap usually embodied with a bent rim, a distance must maintained which corresponds to the clearance necessary for actuating the horn switch. Therefore, the space covered by the cover cap cannot be isolated from its environment to such a degree that a penetration of humidity and dust is avoided. In addition, there is often given cause for complaint in that the clearance required for actuating the horn switch affects the appearance, because one can look through it into the interior space covered by the cover cap.

Therefore, an object of the invention is to provide a cover cap in which the clearance required for actuation of the horn switch is covered as completely as possible, so that the penetration of dust and humidity is made more difficult and the "window" into the space inside of the cap is closed. The visual and physical covering of the clearance should be realized as cost-effective as possible and should be able to be produced with the manufacturing means as used hitherto for the production of cover caps.

According to the invention, the cap is provided with an integrally molded flexible web that extends from the outer edge of the cap towards a frame part of the steering wheel. Preferably, the web is continuous along the outer edge of the cap and it covers the clearance between the cap and the frame part of the steering wheel.

Further details are explained reference to the embodiments illustrated in FIGS. 1 and 2, in which:

FIG. 1a shows a first embodiment of the present invention in cross-section.

FIG. 1b shows a first embodiment of the present invention in cross-section in a different position.

FIG. 2a shows a second embodiment of the present invention in cross-section.

FIG. 2b shows a second embodiment of the present invention in cross-section in a different position.

FIG. 3 shows additional features of the present invention in cross-section.

FIG. 1a and 1b show first embodiment of an apparatus 20 with a cover cap 1 in the non-actuated state (FIG. 1a) and with an actuating surface 8 of the cover cap 1 depressed by the distance x between the schematically shown contacts of the horn switch an actuated state (FIG. 1b). In the left illustration, a clearance 4 is present between a frame part 3 or the like of the steering wheel and the outer edge of the cover cap 1. The outer edge 18 of the cover cap 1 has a peripheral rim 5 bent towards a corresponding surface 12 of the frame part 3 and a continuous web 2 extending towards the frame part 3. The clearance 4 has to be somewhat larger than the contact distance x, so that the body of the cover cap 1 does not come to abut the frame part 3 before the horn switch contacts are closed. The continuous web 2 is molded to the outer edge of the cap 1. The web 2 engages into the frame part 3 and slides therein in telescoping manner when the cover cap 1 is depressed. In so doing, the web 2 is laterally deflected, but kept in contact with the frame part 3 owing to an elastic return force 10. Such a telescopic guidance of the cover cap 1 in the frame part 3 would hardly be conceivable if a hard and inelastic web material was used, because a number of added manufacturing tolerances would have to be taken into consideration. This would be very expensive and at the same time a sticking of the covering cap in the stationary frame could not be excluded since on one-sided depression of the cover cap tilting would occur necessarily which means that a rigid web would get jammed in the frame part 3.

In a second embodiment of an apparatus 20' according to FIGS. 2a and 2b, the flexible web 2' abuts and bears on the frame part 3 with its end. In this way, too, the clearance 4 is covered. When the cover cap 1 is depressed for actuating the horn switch, the web 2' is compressed elastically and the clearance 4 between the rim 5 and the frame part 3 diminishes to a small gap. In this embodiment the return force 10' for returning the cover cap 1 to its unactuated position and hence opening the horn switch contacts is at least to a substantial degree provided by the web 2'. With this version one possibly can dispense with separate return springs.

In both embodiments, the web 2 or 2' is located inwardly of the rim 5 and slightly spaced therefrom, extending parallel to and projecting beyond the rim 5 to cover the clearance 4.

Both embodiments can easily be realized by conventional molding techniques without considerable extra expenses so that the cover caps according to the invention can be produced as hitherto with only slightly modified injection molds.

In a second embodiment of an apparatus 20' according to FIG. 2a and 2b, the body of the cap 1 is formed of a schematically shown relatively hard core 6 and a cover layer 7 of synthetic material, the web 2 or 2' is preferably molded with the cover layer 7.

What is claimed is:

1. An apparatus comprising:
    a cover cap for an airbag unit accommodated in a steering wheel; and
    a frame part for accommodating the airbag unit,
    the cover cap having a body consisting of synthetic material, an actuating surface, an outer edge portion, and an integrally molded flexible web,
    the cover cap being arranged for movement in an actuating direction against an elastic return force of the cover cap thereby actuating horn contacts,
    the outer edge portion of the cover cap being located opposite and spaced apart from a corresponding surface of the frame part,
    the flexible web of the cover cap extending toward the corresponding surface of the frame part for preventing dust and humidity from penetrating the steering wheel.

2. The apparatus according to claim 1, wherein the web is continuous along the outer edge portion of the cover cap.

3. The apparatus according to claim 2, wherein the web extends across a clearance between the outer edge portion of the cover cap and the frame part of the steering wheel.

4. The apparatus according to claim 3, wherein the web internally contacts the frame part and is laterally deflected thereby upon movement of the cover cap towards the frame part.

5. The apparatus according to claim 3, wherein the web extends into abutment of the frame part and is elastically compressed upon movement of the cover cap towards the frame part.

6. The apparatus according to claim 1, wherein said return force is provided by elastic deformation of the web.

7. The apparatus according to claim 1, wherein the body of the cover cap comprises a structural layer and a covering layer made of synthetic material, the web being molded to the covering layer and the structural layer being harder than the covering layer.

8. The apparatus according to claim 1, wherein the outer edge portion of the cover cap has a rim bent towards the frame part and the web is located inwardly of, parallel to, and projecting farther from the cover cap than the rim.

* * * * *

UNITED STATES PATENT AND TRADEMARK OFFICE
CERTIFICATE OF CORRECTION

PATENT NO. : 6,149,189
DATED : November 21, 2000
INVENTOR(S) : Holger Kreile

It is certified that error appears in the above-indentified patent and that said Letters Patent is hereby corrected as shown below:

Column 4, page 4, change "1" to "5"

Signed and Sealed this

Twenty-ninth Day of May, 2001

Attest:

NICHOLAS P. GODICI

Attesting Officer

Acting Director of the United States Patent and Trademark Office